(12) United States Patent
Xu et al.

(10) Patent No.: US 9,924,127 B2
(45) Date of Patent: Mar. 20, 2018

(54) TELEVISION PEDESTAL AND TELEVISION APPLYING THE SAME

(71) Applicant: Boe Technology Group Co., Ltd., Beijing (CN)

(72) Inventors: Jian Xu, Beijing (CN); Yong Qiao, Beijing (CN); Jianbo Xian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 194 days.

(21) Appl. No.: 14/778,214

(22) PCT Filed: Mar. 12, 2015

(86) PCT No.: PCT/CN2015/074113
§ 371 (c)(1),
(2) Date: Sep. 18, 2015

(87) PCT Pub. No.: WO2016/061977
PCT Pub. Date: Apr. 28, 2016

(65) Prior Publication Data
US 2016/0286154 A1 Sep. 29, 2016

(30) Foreign Application Priority Data

Oct. 21, 2014 (CN) .................... 2014 2 0611574 U

(51) Int. Cl.
*H04N 5/655* (2006.01)
*F16M 11/08* (2006.01)
(Continued)

(52) U.S. Cl.
CPC ............ *H04N 5/655* (2013.01); *F16M 11/08* (2013.01); *F16M 11/22* (2013.01); *A47B 2097/005* (2013.01); *F16M 2200/08* (2013.01)

(58) Field of Classification Search
CPC ...................................................... H04N 5/655
See application file for complete search history.

(56) References Cited

U.S. PATENT DOCUMENTS 8,523,132 B2 * 9/2013 Chen .................... G06F 1/1607
248/176.1
8,934,061 B1 * 1/2015 Wengreen ................ H04N 5/64
348/836

(Continued)

FOREIGN PATENT DOCUMENTS

CN 2676534 2/2005
CN 101090002 A 12/2007
(Continued)

OTHER PUBLICATIONS

International Search Report and Written Opinion from PCT/CN15/074113 dated Jul. 17, 2015.

*Primary Examiner* — Jayanti K Patel
*Assistant Examiner* — Irfan Habib
(74) *Attorney, Agent, or Firm* — Calfee, Halter & Griswold LLP

(57) ABSTRACT

The present invention discloses a television pedestal and a television applying the same, and relates to the technical field of televisions. The television pedestal comprises a base comprising a base body in a shape of a plate. The base body is provided with a first threaded through hole and connected with a holding block via a bolt. A bottom surface of the holding block is provided with a second threaded hole which corresponds to the first threaded through hole. When the television pedestal is connected with the television body, the holding block is connected with a backplane arranged in the television body. The holding block is disposed inside a back cover of the television body. The television pedestal can be applied to a television for enhancing the convenience and comfort for the user during usage of the television and improving the overall appearance of the television.

9 Claims, 5 Drawing Sheets

(51) Int. Cl.
*F16M 11/22* (2006.01)
*A47B 97/00* (2006.01)

(56) References Cited

U.S. PATENT DOCUMENTS

| | | | | |
|---|---|---|---|---|
| 9,103,494 | B2* | 8/2015 | Yoon | F16M 11/04 |
| 9,323,088 | B2* | 4/2016 | Tomomasa | G02F 1/133308 |
| 9,383,506 | B2* | 7/2016 | Hosoki | G02F 1/133308 |
| 9,765,923 | B2* | 9/2017 | Skull | F16M 13/02 |
| 2007/0152114 | A1* | 7/2007 | Choi | F16M 11/10 |
| | | | | 248/168 |
| 2015/0097102 | A1* | 4/2015 | Cassidy | A47B 85/00 |
| | | | | 248/558 |

FOREIGN PATENT DOCUMENTS

| | | | | |
|---|---|---|---|---|
| CN | 201467328 | | 5/2010 | |
| CN | 201479288 U | | 5/2010 | |
| CN | 202521178 | | 11/2012 | |
| CN | 202546146 | | 11/2012 | |
| CN | 204069161 | | 12/2014 | |
| JP | 2007074569 | | 3/2007 | |
| JP | 2009103770 | * | 5/2009 | H04N 5/64 |
| JP | 5094331 | | 12/2012 | |
| TW | M270300 U | | 7/2005 | |
| WO | 2014/127838 | | 8/2014 | |

* cited by examiner

TELEVISION PEDESTAL AND TELEVISION APPLYING THE SAME

The present application is the U.S. national phase entry of PCT/CN2015/074113, filed on Mar. 12, 2015, which claims the benefit of Chinese Patent Application No. 201420611574.8, filed Oct. 21, 2014, the entire disclosures of which are incorporated herein by reference.

FIELD OF THE INVENTION

The present invention relates to the technical field of television, and in particular to a television pedestal and a television applying the same.

BACKGROUND ART

A television body mainly comprises components such as a display panel, a front frame, a back cover and so on, wherein the back cover is provided with a backlight backplane on which a plurality of circuit boards are disposed. The television body is usually provided with a pedestal at the bottom thereof for supporting the television body.

The existing television pedestal is typically provided with a through hole and thereby connected with the television body via a bolt, for example, as disclosed in the Chinese patent document CN201479288U. However, the bolt for connection is exposed outside the television body when such television pedestal is connected with the television body, therefore, the exposed bolt may be eroded by the dust and moisture in the air, in particular, the bolt of metal material tends to rust easily, which may cause inconvenience to the cleaning and maintenance for the television, and may bring trouble when removing the television body from the television pedestal or reinstalling the television body. Moreover, due to such television design, the overall appearance of the television is poor.

SUMMARY

The embodiments of the present invention provide a television pedestal and a television applying the same, so as to mitigate or alleviate at least some of the problems mentioned above about the existing television.

To this end, the embodiments of the present invention provide the following technical solutions:

A television pedestal comprising a base, which base comprises a base body in a shape of a plate. The base body is provided with a first threaded through hole and connected with a holding block via a first bolt; and a bottom of the holding block is provided with a second threaded hole which corresponds to the first threaded through hole;

When the television pedestal is connected with the television body, the holding block is connected with the backplane of the television body and disposed inside the back cover of the television body.

In the television pedestal provided by the embodiments, as the base body is provided with a first threaded through hole and the bottom of the holding block is provided with a second threaded hole, a bolt can pass through the first threaded through hole and the second threaded hole sequentially, i.e., the base body can be connected with the holding block via the bolt; since the bolt passes through the first threaded through hole and the second threaded hole sequentially, the threaded portion of the bolt is hidden in the holding block and the head portion of the bolt is hidden in the base. Thus the bolt that plays the role of connecting the base body and the holding block is completely concealed; and meanwhile since the holding block is disposed inside the back cover of the television body, it is invisible. As a result, the television pedestal provided by the embodiment of the invention can mitigate the erosion to the components of the television pedestal caused by the moisture and dust from ambient air, which is convenient for the user to clean or maintain the television pedestal and helpful for enhancing convenience and comfort for the user during usage of the television, meanwhile, the overall appearance of the television can be improved.

Further, the base body can be provided with a rotating table, and inside the rotating table a first empty slot can be provided, which may accommodate a connection pillar in a matched manner. The connection pillar is a hollow "回"-shaped structure (i.e., in a shape of the Chinese character "回"), and the second threaded through hole is arranged in a top surface of the "回"-shaped structure. The rotating table comprising the "回"-shaped structure can increase the structural intensity of the television pedestal and thereby enhance the bearing capacity of the base for the television body.

In an embodiment, the holding block is in a cuboid shape, and an extension part may extend from a top surface of the holding block towards a direction facing away from a bottom surface thereof;

When the television pedestal is connected with the television body, the top surface of the holding block and a front surface of the extension part are attached to the backplane; a thickness of the extension part is less than or equal to that of a circuit board having the largest thickness arranged on the backplane, and a back surface of the extension part is opposite to an inner surface of the back cover; the bottom surface of the holding block is flush with a bottom surface of the television body. The fact that the bottom surface of the holding block is flush with the bottom surface of the television body ensures the effect of complete concealment of the holding block inside the back cover, as it is completely covered by the back cover, which makes the television pedestal more concise and better in appearance.

In an embodiment, the extension part is provided with a third threaded hole; the third threaded hole is configured to be perforated by a second bolt so as to connect the holding block with the backplane of the television body.

Wherein, the base may further comprise a rotating table support arranged between the rotating table and the base body. The rotating table support can support the rotating table, and hence further enhance the bearing capacity of the base and thereby further increase the structural intensity of the television pedestal.

Further, the base further comprises a rotating axis arranged on the rotating table support; at the bottom of the rotating table a connection through hole is provided, with which the rotating axis may be rotatably connected. The rotatable connection of the rotating axis and the connection through hole enables the rotating table to rotate around the rotating axis. When the rotating table rotates around the rotating axis, the "回"-shaped structure in connection with the rotating table, the holding block and the television body can rotate together therewith, hence rotation of the television body can be achieved, which makes it convenient to adjust an orientation of the display panel of the television body when watching the television.

In an embodiment, the rotating table is a revolving body with a curved surface.

Wherein, the connection pillar may also be in a cuboid shape, and the connection pillar in a cuboid shape can be in clearance fit with the first empty slot.

In an embodiment, the connection through hole may run through a bottom surface of the "回"-shaped structure.

Embodiments of the present invention also provide a television comprising any one of the above television pedestals.

DETAILED DESCRIPTION OF EMBODIMENTS

Figure 1:
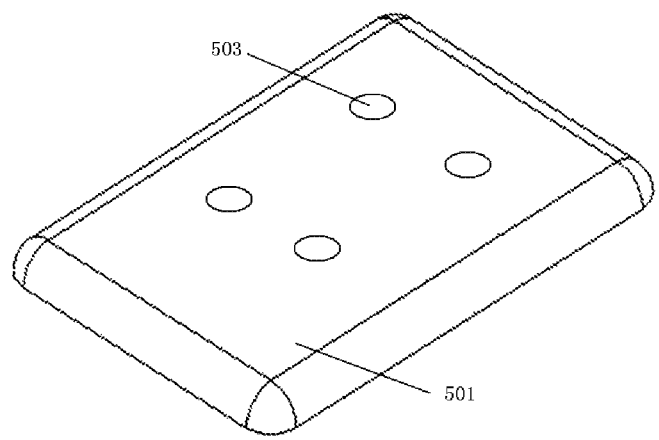
FIG. 1 is a schematic view of a base of a television pedestal provided by an embodiment of the present invention.

The embodiments of the present invention will be described in details as follows with reference to the drawings.

In the description of the present invention, it should be understood that orientation or position relations indicated by the terms of "center", "up", "down", "front", "back", "left", "right", "vertical", "horizontal", "top", "bottom", "inside", "outside" and so on are based on the orientation or position relations shown in the drawings, only for the purpose of facilitating and simplifying description of the present invention, and they do not indicate or imply that the device or element involved must have a specified orientation or be constructed and operated in a specified orientation. Thus they cannot be construed as limiting the present invention.

The terms of "first" and "second" are only used for description purpose and cannot be construed as indicating or implying the relative importance or implicitly indicating the number of the technical features involved. Thereby, features defined by "first" and "second" can explicitly or implicitly comprise one or more such features. Unless specified otherwise, the term of "a plurality" means two or more in the description of the present invention.

In the description of the present invention, what needs to be explained is that, unless specified and defined otherwise, the terms of "install", "join" and "connect" should be construed in a broad sense, e.g., as fixedly connecting, or removably connecting, or integrally connecting; as joining directly or indirectly via an intermediate media, or communicating internally between two elements. For a person skilled in the art, the specific meanings of the above terms in the present invention can be understood in specific situations.

Figure 2:
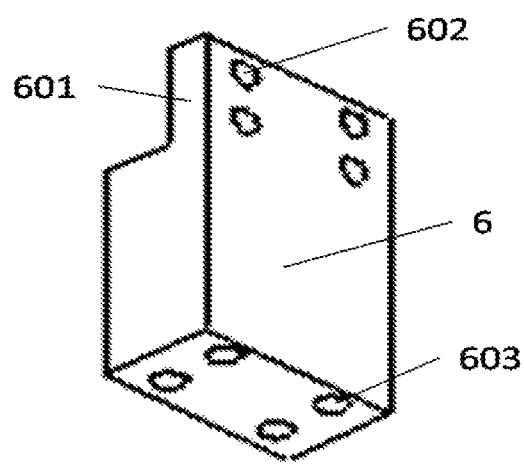
FIG. 2 is a schematic structural view of a holding block provided by an embodiment of the present invention.
Figure 3:
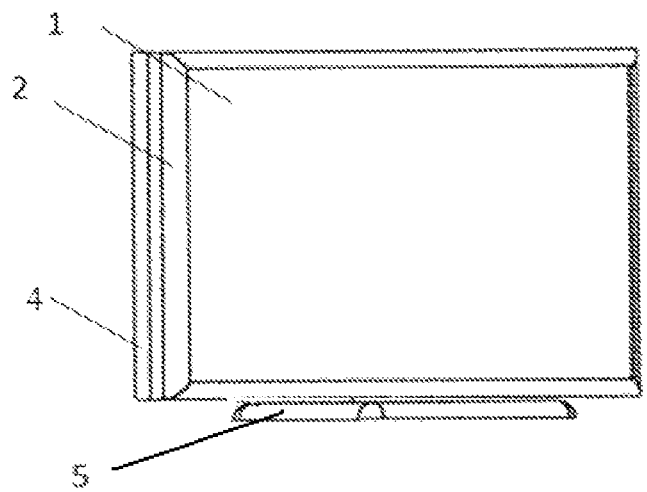
FIG. 3 is a schematic front view of a television provided by an embodiment of the present invention.

Referring to FIG. 1 to FIG. 3, an embodiment of the present invention provides a television pedestal comprising a base 5 which comprises a base body 501. The base body 501 is provided with a first threaded through hole 503 and can be connected with a holding block 6 via a first bolt, and a bottom surface of the holding block 6 is provided with a second threaded hole 603 which corresponds to the first threaded through hole 503. When the television pedestal is connected with the television body, the holding block 6 is connected with the backplane in the television body and disposed inside a back cover 4 of the television body. In the television pedestal provided in the embodiment of the present invention, the base body 501 is in a shape of a plate and comprises a flat surface in which the first threaded through hole 503 can be arranged. Since the base body 501 is provided with the first threaded through hole 503 and the bottom surface of the holding block 6 is provided with the second threaded hole 603, a bolt can pass through the first threaded through hole 503 and the second threaded hole 603 sequentially, i.e., the base body 501 can be connected with the holding block 6 via the bolt. Since the bolt passes through the first threaded through hole 503 and the second threaded hole 603 sequentially, the threaded portion of the bolt is hidden in the holding block 6 and the head portion of the bolt is hidden in the base body 501. Thus the bolt that plays the role of connecting the base body 501 and the holding block 6 is completely concealed; and meanwhile since the holding block 6 is disposed inside the back cover 4 of the television body, it is invisible. As a result, such television pedestal design may mitigate the erosion to the components of the television pedestal caused by the moisture and dust from ambient air, which is convenient for the user to clean or maintain the television pedestal and helpful for enhancing convenience and comfort for the user during usage of the television, meanwhile, the overall appearance of the television can be improved.

Referring to FIG. 4 to FIG. 7 and in connection with FIG. 2, in a television pedestal provided in a further embodiment of the present invention, a rotating table 8 can be arranged on the base 5, and inside the rotating table 8 a first empty slot 801 can be provided, which can accommodate a connection pillar in a matched manner. The connection pillar can be a hollow "回"-shaped structure 9, and a second threaded through hole 903 may be arranged in a top surface of the "回"-shaped structure 9. A bolt can pass through the second threaded through hole 903 and the second threaded hole 603 on the bottom surface of the holding block 6 to achieve connection of the rotating table 8 and the holding block 6.

Figure 6:
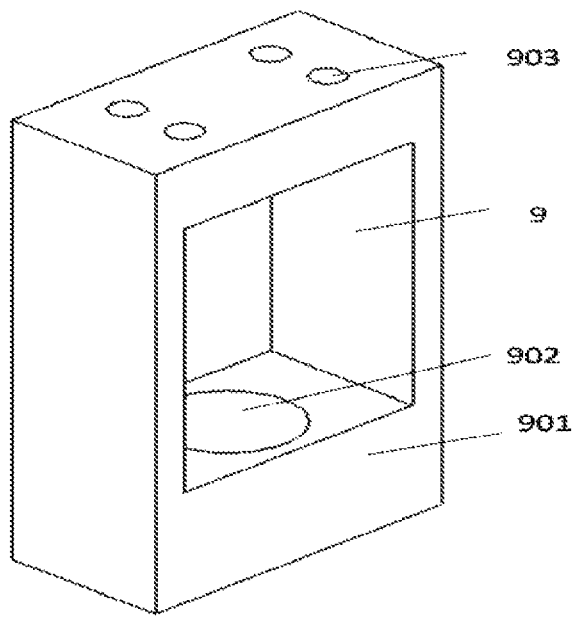
FIG. 6 is a schematic view of a "回"-shaped structure in a television pedestal provided by a further embodiment of the present invention.

It is noted that, the Chinese character "回" mentioned herein means the shape of the hollow connection pillar as a whole. That is to say, the center portion of the connection pillar has been removed, and thus the connection pillar is hollow, as a result, the connection pillar as a whole has a shape similar to the Chinese character "回". For example, as shown in FIG. 6, the center portion of a cuboid is removed, thereby resulting in a hollow structure that has a shape similar to the Chinese character "回".

Since the connection pillar is the hollow "回"-shaped structure 9, and in the top surface of the "回"-shaped structure 9 a second threaded through hole 903 is provided and in the bottom surface of the holding block 6 a second threaded hole 603 is provided, a bolt can pass through the second threaded through hole 903 and the second threaded hole 603 sequentially, achieving connection of the "回"-shaped structure 9 and the holding block 6. Since the bolt passes through the second threaded through hole 903 and the second threaded hole 603 sequentially, the threaded portion of the bolt is hidden in the holding block 6 and the head portion of the bolt is hidden in the "回"-shaped structure 9. Moreover, the "回"-shaped structure 9 can be accommodated in the first empty slot 801, therefore, when the holding block 6 is connected with the backplane 3 of the television body, the "回"-shaped structure 9 accommodated in the first empty slot 801 of the rotating table 8 is invisible, so is the bolt that plays the role of connection. Meanwhile, since the holding block 6 is disposed inside the back cover 4 of the television body, the holding block 6 is also invisible. Therefore, only the base 5 and the rotating table 8 on the base 5 can be seen, and accordingly, convenience and comfort for the user during usage of the television can be enhanced, also the overall appearance of the television can be improved.

Figure 4:
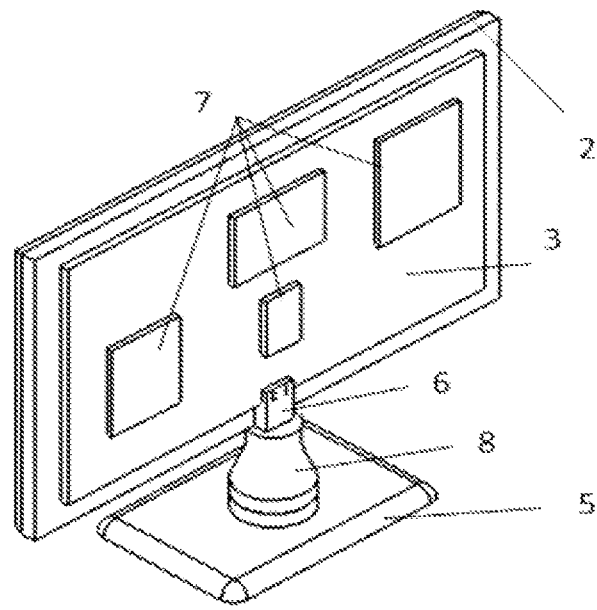
FIG. 4 is a schematic back view of a television provided by a further embodiment of the present invention.

Referring back to FIG. 2 and in connection with FIG. 4, in the above embodiments, the holding block 6 can be in a cuboid shape, and an extension part 601 may extend from a top surface of the holding block 6 towards a direction facing away from a bottom surface thereof. When the television pedestal is connected with the television body, both the top surface of the holding block 6 and a front surface of the extension part 601 are attached to the backplane 3; the thickness of the extension part 601 is less than or equal to that of a circuit board 7 arranged on the backplane 3 which has the largest thickness, and a back surface of the extension part 601 is opposite to an inner surface of the back cover 4; the bottom surface of the holding block 6 may be flush with a bottom surface of the television body.

Figure 8:
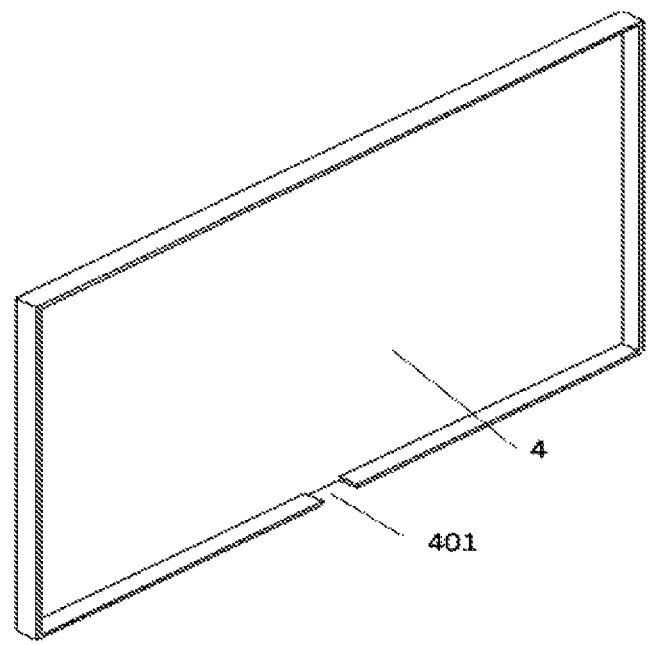
FIG. 8 is a schematic view of a back cover of a television provided by the embodiments of the present invention.

When the television pedestal is connected with the television body, since the holding block 6 is disposed inside the back cover 4, a groove 401 can be provided in the back cover 4 of the television such that the holding block 6 can be accommodated inside the back cover 4 through the groove 401, as shown in FIG. 8. The holding block 6 in a cuboid shape has a regular shape, with simple manufacture processes and a small occupied space. Since both the top surface of the cuboid and the front surface of the extension part 601 are attached to the backplane 3, the holding block 6 can be connected with the backplane 3. For example, the backplane 3 and the holding block 6 can be fixedly connected by way of bonding or welding, and of course they can also be joined together by removable connection.

The back surface of the extension part 601 is opposite to the back cover 4, and the thickness of the extension part 601 is smaller than or equal to that of a circuit board 7 having the largest thickness arranged on the backplane 3. Thus, too large thickness of the extension part 601 can be avoided, which may hamper the installation of the back cover 4. Therefore, the extension part 601 will not influence the thickness of the television body, and to a certain extent, it is even favorable for a thinner design of the television body.

Wherein, the fact that the bottom surface of the holding block 6 is flush with the bottom surface of the television body ensures the effect of complete concealment of the holding block 6 inside the back cover 4, as it is completely covered by the back cover 4, which makes the television pedestal more concise and better in appearance.

As shown in FIG. 2, in the back surface of the extension part 601, a third threaded hole 602 can be further provided; the third threaded hole 602 is configured to be perforated by a second bolt so as to connect the holding block 6 with the backplane 3 of the television body. The connection of the holding block 6 with the backplane 3 via a bolt achieves removable connection of the television pedestal with the television body, which facilitates installation and maintenance.

Figure 9:
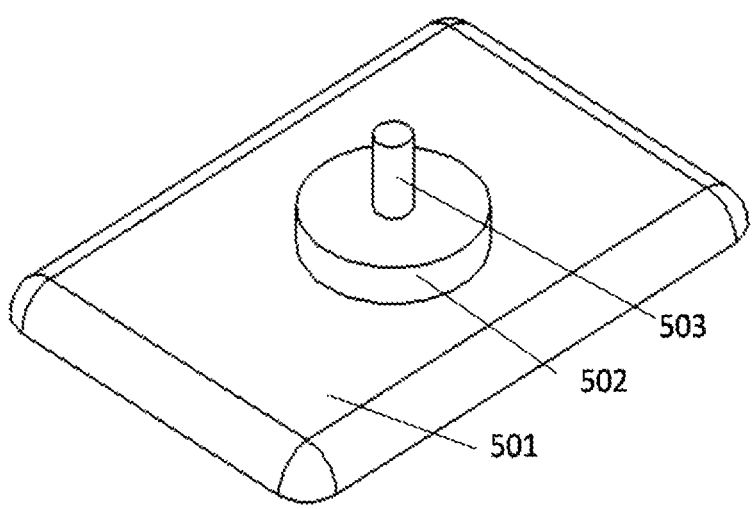
FIG. 9 is a schematic view of a base, a rotating table support and a rotating axis in a television pedestal provided by a further embodiment of the present invention.

In a further embodiment of a television pedestal provided in the present invention, referring to FIG. 9, wherein, the base of the television pedestal can further comprise a rotating table support 502 arranged between the rotating table and the base body 501. The rotating table support 502 can support the rotating table, and hence further enhance the bearing capacity of the base 501, and thereby further increase the structural intensity of the television pedestal.

Figure 7:
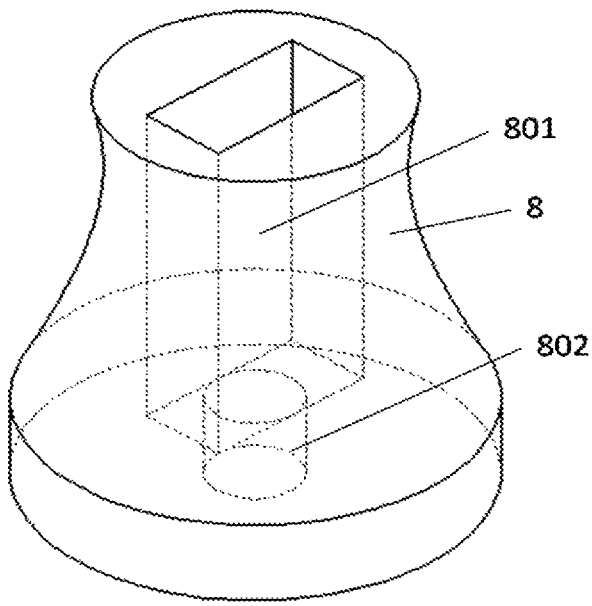
FIG. 7 is a schematic structural view of a rotating table of a television pedestal provided by a further embodiment of the present invention.

Furthermore, referring to FIG. 9 and in connection with FIG. 7, the base can further comprise a rotating axis 503 arranged on the rotating table support 502; at the bottom of the rotating table 8 a connection through hole 802 is provided, with which the rotating axis 503 can be rotatably connected such that the rotating table 8 can rotate around the rotating axis 503. Since the rotating table 8 can rotate around the rotating axis 503, when the rotating table 8 rotates around the rotating axis 503, the "回"-shaped structure 9, the holding block 6 and the television body in connection with the rotating table 8 rotate together therewith, so rotation of the television body is achieved, which makes it convenient to adjust an orientation of the display panel of the television body when watching the television.

In an embodiment, the rotating table 8 can be a revolving body with a curved surface such that the rotating table 8 is even better in appearance.

Referring to FIG. 6, wherein, the connection pillar can also be in a cuboid shape, and the "回"-shaped structure 9 in a cuboid shape may be easy to be processed and can be in clearance fit with the first empty slot 801. The "回"-shaped structure 9 can be in clearance fit with the first empty slot 801 to ensure that the "回"-shaped structure 9 can be easily installed into the first empty slot 801 and that the position relation of the "回"-shaped structure 9 and the first empty slot 801 will not be easily changed.

Referring to FIG. 6 and FIG. 7, in the above embodiments, the connection through hole 802 can further run through a bottom surface of the "回"-shaped structure 9, such that when the rotating axis 503 is in connection with the rotating table 8, the rotating axis 503 sequentially passes through the bottom of the rotating table 8 and the "回"-shaped structure 9, thereby making the connection of the rotating axis 503 and the rotating table 8 more stable. For example, as shown in FIG. 6, the bottom 901 of the "回"-shaped structure 9 can be provided with a through hole 902 in communication with the connection through hole 802. In an embodiment, in order to enhance the stability when the television pedestal is in connection with the television body, the rotating table 8 can be positioned in the center of the base body 501.

Figure 5:
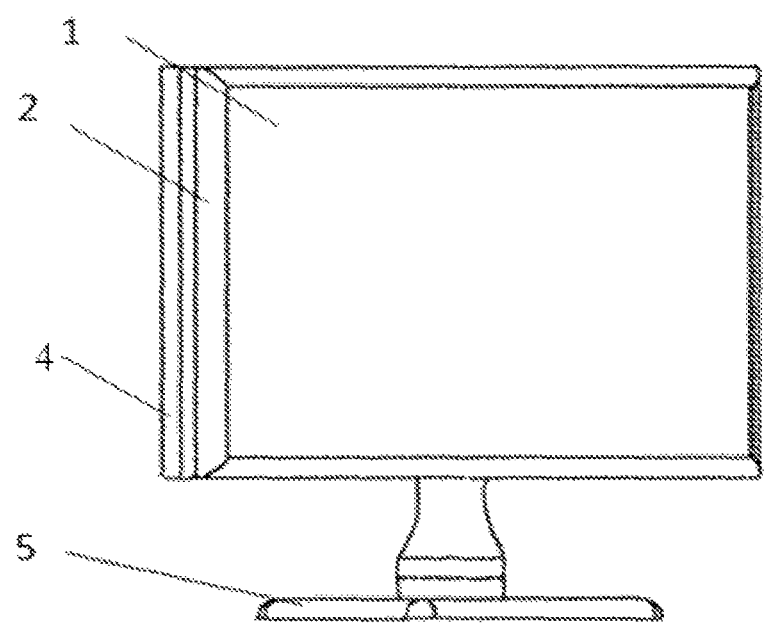
FIG. 5 is a schematic front view of a television provided by a further embodiment of the present invention.

Referring to FIG. 3 to FIG. 5, the embodiments of the present invention further provide a television comprising the television pedestal described in any one of the above embodiments. In an embodiment of a television according to the present invention, since the base body 501 of the television is provided with a first threaded through hole 503, and the bottom surface of the holding block 6 is provided with a second threaded hole 603, a bolt can pass through the first threaded through hole 503 and the second threaded hole 603 sequentially, i.e., the base body 501 can be connected with the holding block 6 via the bolt. Therefore, the threaded portion of the bolt is hidden in the holding block 6 and the head portion of the bolt is hidden in the base body 501. Meanwhile since the holding block 6 can be disposed inside the back cover 4 of the television body after the television pedestal is connected with the television body, the holding block 6 is invisible. As a result, such television design may mitigate the erosion to the components of the television pedestal caused by the moisture and dust from ambient air, which is convenient for the user to clean or maintain the television pedestal and helpful for enhancing convenience and comfort for the user during usage of the television, meanwhile, the overall appearance of the television can be improved.

In a further embodiment of the television according to the present invention, since the television pedestal comprises a rotating table 8 and the connection pillar of the rotating table 8 is a hollow "回"-shaped structure 9, and the top surface of the "回"-shaped structure 9 is provided with a second threaded through hole 903, and the bottom surface of the holding block 6 is provided with a second threaded hole 603, a bolt can pass through the second threaded through hole 903 and the second threaded hole 603 sequentially, achieving connection of the "回"-shaped structure 9 and the holding block 6. Since the bolt passes through the second threaded through hole 903 and the second threaded hole 603 sequentially, the threaded portion of the bolt is hidden in the holding block 6 and the head portion of the bolt is hidden in the "回"-shaped structure 9. Moreover, the "回"-shaped structure 9 can be accommodated in the first empty slot 801, hence, the "回"-shaped structure 9 accommodated in the first empty slot 801 of the rotating table 8 is invisible, so is the bolt that plays the role of connection, when the holding block 6 is connected with the backlight backplane 3 of the television body; and since the holding block 6 may be disposed inside the back cover 4 of the television body, the holding block 6 is also invisible. Therefore, only the base body 501 and the rotating table 8 on the base can be seen, and accordingly the overall appearance of the television can be improved. Meanwhile, the rotating table 8 comprising the "回"-shaped structure can increase the structural intensity of the television pedestal and enhance the bearing capacity of the base 5 for the television body.

In a further embodiment of the television according to the present invention, the base 5 may further comprises a rotating table support 502 and a rotating axis 503 arranged on the rotating table support 502; and at the bottom of the rotating table 8 a connection through hole 802 is provided, with which the rotating axis 503 can be rotatably connected, such that the rotating table 8 can rotate around the rotating axis 503. Since the rotating table 8 can rotate around the rotating axis 503, when the rotating table 8 rotates around the rotating axis 503, the "回"-shaped structure 9 in connection with the rotating table 8, the holding block 6 and the television body can rotate together therewith, thereby rotation of the television body can be achieved, which makes it convenient to adjust an orientation of the display panel of the television body when watching the television.

In the description of this specification, specific features, structures, materials or characteristics can be combined properly in any one or more embodiments or examples.

The above stated is only specific embodiments of the present invention, but the protection scope of the present invention shall not be limited to these. Any variations or alternatives that are easily conceivable within the technical scope disclosed in the present invention for a skilled person in the art shall fall within the protection scope of the present invention. Therefore, the protection scope of the present invention shall be subject to the protection scope of the claims.

What is claimed is:

1. A television pedestal comprising a base, wherein the base comprises a base body in a shape of a plate, the base body being provided with a first threaded through hole and connected with a holding block via a first bolt;
   and wherein a bottom of the holding block comprises a second threaded hole which corresponds to the first threaded through hole;
   when the television pedestal is connected with the television body, the holding block is connected with a backplane of the television body and positioned inside a back cover of the television body,
   wherein the holding block is in a cuboid shape, and an extension part extends from a top surface of the holding block towards a direction facing away from a bottom surface thereof;
   when the television pedestal is connected with the television body, the top surface of the holding block and a front surface of the extension part are attached to the backplane; wherein a thickness of the extension part is less than or equal to that of a circuit board having the largest thickness arranged on the backplane, and a back surface of the extension part is opposite to an inner surface of the back cover; the bottom surface of the holding block is flush with a bottom surface of the television body.

2. The television pedestal according to claim 1, wherein a rotating table is arranged on the base body, and inside the rotating table a first empty slot is provided, which accommodates a connection pillar in a matched manner, wherein the connection pillar is a hollow "回"-shaped structure, and the second threaded through hole is arranged in a top surface of the "回"-shaped structure.

3. The television pedestal according to claim 2, wherein the base further comprises a rotating table support arranged between the rotating table and the base body.

4. The television pedestal according to claim 3, wherein the base further comprises a rotating axis arranged on the rotating table support; at the bottom of the rotating table a connection through hole is provided, with which the rotating axis is rotatably connected.

5. The television pedestal according to claim 4, wherein the connection through hole runs through a bottom surface of the "回"-shaped structure.

6. The television pedestal according to claim 2, wherein the rotating table is a revolving body with a curved surface.

7. The television pedestal according to claim 2, wherein the connection pillar is in a cuboid shape, and the connection pillar in a cuboid shape is in clearance fit with the first empty slot.

8. The television pedestal according to claim 1, wherein the extension part is provided with a third threaded hole; and the third threaded hole is configured to be perforated by a second bolt so as to connect the holding block with the backplane of the television body.

9. A television comprising a television pedestal, the television pedestal comprising a base, wherein the base comprises a base body in a shape of a plate, the base body being provided with a first threaded through hole and connected with a holding block via a first bolt;
   and wherein a bottom of the holding block comprises a second threaded hole which corresponds to the first threaded through hole;
   when the television pedestal is connected with the television body, the holding block is connected with a backplane of the television body and positioned inside a back cover of the television body, wherein the holding block is in a cuboid shape, and an extension part extends from a top surface of the holding block towards a direction facing away from a bottom surface thereof;

when the television pedestal is connected with the television body, the top surface of the holding block and a front surface of the extension part are attached to the backplane; wherein a thickness of the extension part is less than or equal to that of a circuit board having the largest thickness arranged on the backplane, and a back surface of the extension part is opposite to an inner surface of the back cover; the bottom surface of the holding block is flush with a bottom surface of the television body.

* * * * *